United States Patent [19]
Takeuchi

[11] Patent Number: 5,101,659
[45] Date of Patent: Apr. 7, 1992

[54] MOUNTING DEVICE FOR PRESSURE SENSOR

[75] Inventor: Kiyoshi Takeuchi, Yokohama, Japan

[73] Assignee: Nissan Motor Co., Ltd., Yokohama, Japan

[21] Appl. No.: 678,829

[22] Filed: Apr. 3, 1991

[30] Foreign Application Priority Data

Apr. 12, 1990 [JP] Japan ................................ 2-96970

[51] Int. Cl.⁵ .......................................... G01M 15/00
[52] U.S. Cl. .................................................... 73/115
[58] Field of Search ....................... 73/115, 714, 754; 123/425

[56] References Cited

U.S. PATENT DOCUMENTS

4,969,353 11/1990 Steinke ................................. 73/115

Primary Examiner—Jerry W. Myracle
Attorney, Agent, or Firm—Foley & Lardner

[57] ABSTRACT

A mounting device for a pressure sensor is disclosed. The mounting device comprises a cylinder head having a threaded hole for mounting a spark plug, a sensor housing orifice penetrating into a combustion chamber and a sensor pressure receiving section in the sensor housing orifice. A pressure sensor is mounted in the sensor housing orifice. The pressure sensor comprises a housing inserted into the sensor housing orifice and having a pressure receiving section for directly receiving the combustion pressure, and a piezoelectric device housed in the housing and producing a voltage corresponding to the combustion pressure received at the pressure received section. The device comprises a presser member pressing the pressure sensor toward the pressure receiving section by tightening of the spark plug. A vibration absorbing member is interposed between the presser member and the pressure sensor so as to absorb the vibration and the displacement transmitted from the presser member.

11 Claims, 6 Drawing Sheets

MOUNTING DEVICE FOR PRESSURE SENSOR

BACKGROUND OF THE INVENTION

1. Field of the Invention

The present invention relates to a mounting device for a pressure sensor which detects the combustion pressure in an engine and more particularly to a mounting device used for mounting a pressure sensor on a cylinder head by making use of the screwed connection of a spark plug to a cylinder head.

2. Description of the Prior Art

A pressure sensor which detects the combustion pressure inside a combustion chamber surrounded by a cylinder block, a piston, and a cylinder head is used in an engine control system for controlling the ignition timing and amount of fuel injection to provide optimum combustion.

Figure 1:
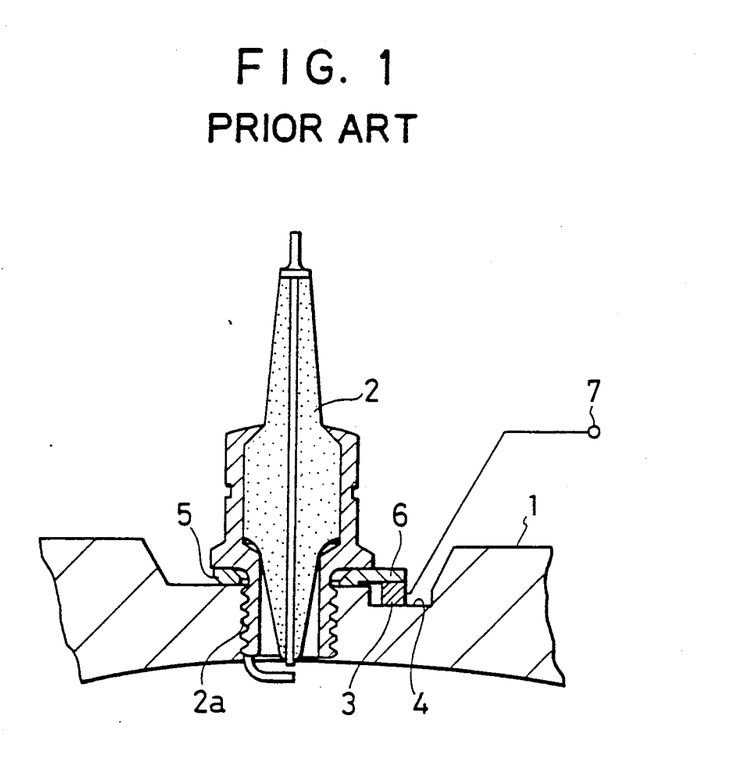
FIG. 1 is a sectional view showing the mounting conditions for a conventional pressure sensor.

An example of a conventional mounting device for this type of pressure sensor is disclosed in Japanese Utility Model Application 63-11869 and illustrated in FIG. 1.

FIG. 1 is a is a sectional view showing the mounting conditions for a conventional pressure sensor. Illustrated in the drawing are an engine cylinder head 1, a spark plug 2 which is screwed into the cylinder head 1, and a pressure sensor 3 for detecting the combustion pressure. The pressure sensor 3 is positioned in an indentation 4 formed in the cylinder head 1 close to the mounting section of the spark plug 2. In addition, when the spark plug 2 is secrewed into the cylinder head 1, spaced by a metal gasket 5, the pressure sensor 3 is maintained in place by the application of pressure on its upper surface by a presser member 6 which projects from the gasket 5.

The combustion pressure at the pressure sensor 3 maintained in this manner is transmitted through the spark plug 2, the gasket 5, and the presser member 6 in the following manner. Specifically, because a threaded section 2a of the spark plug 2 has a spring constant which responds to the combustion pressure, when the combustion pressure is applied to the open end surface of the spark plug 2, the spark plug 2 is displaced corresponding to changes in the combustion pressure. This displacement acts on the pressure sensor 3 through the gasket 5 adn the pressure member 6. As a result, a signal corresponding to the combustion pressure is output from the pressure sensor 3 to a terminal 7.

In the conventional pressure sensor mounting device described in the foregoing, the pressure sensor 3 is secured to the cylinder head 1 by the application of pressure by the pressure member 5 provided on the gasket 5 of the spark plug 2. Therefore, the conventional pressure sensor is suitable for use in an engine such as a 4-valve DOHC (Double Over Head Cam) engine which has no excess space around the combustion chamber. On the other hand, however, the following problems are associated with this device. Specifically, because the combustion pressure is transmitted to the pressure sensor 3 through the spark plug 2 and the gasket 5, the vibrations in the spark plug 2 itself act upon the pressure sensor 3, and an accurate combustion pressure cannot be detected.

In addition, the tightening force of the spark plug 2 acts on the pressure sensor 3, so that when the tightening force of the spark plug 2 changes, the sensitivity of the pressure sensor also changes.

SUMMARY OF THE INVENTION

An object of the present invention is to provide, with due consideration to the drawbacks of such conventional methods, a mounting device for a pressure sensor whereby the action of the vibration and the displacement of the spark plug on the pressure sensor is restrained, so that it is possible to detect the pressure with high accuracy.

This object is achieved in the present invention by the provision of a mounting device for a pressure sensor, comprising: (a) a cylinder head having a threaded hole for mounting a spark plug, a sensor housing orifice penetrating into a combustion chamber adjacent to the threaded hole, and sensor receiving section in the sensor housing orifice; (b) a pressure sensor comprising (1) a housing inserted into the sensor housing orifice and having a pressure receiving section provided on the end section of the combustion chamber side and directly receiving the combustion pressure, and (2) a piezoelectric device housed in the housing and producing a voltage corresponding to the combustion pressure received at the pressure receiving section; (c) a presser member pressing the pressure sensor toward the pressure receiving section by tightening of the spark plug when the spark plug is installed in the cylinder head; and (d) a vibration absorbing member interposed between the presser member and the pressure sensor and absorbing the vibration and the displacement transmitted from the presser member.

In the pressure sensor mounting device of the present invention, the pressure applied to a pressure sensor produced on a presser member from the tightening of a spark plug is applied to a housing of the pressure sensor through a vibration absorbing member, and does not act on a piezoelectric device. Accordingly, because the vibration and the displacement in the spark plug produced by the combustion pressure does not act on the piezoelectric device, the combustion pressure can be accurately detected, unaffected by the vibration in the spark plug.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 2:
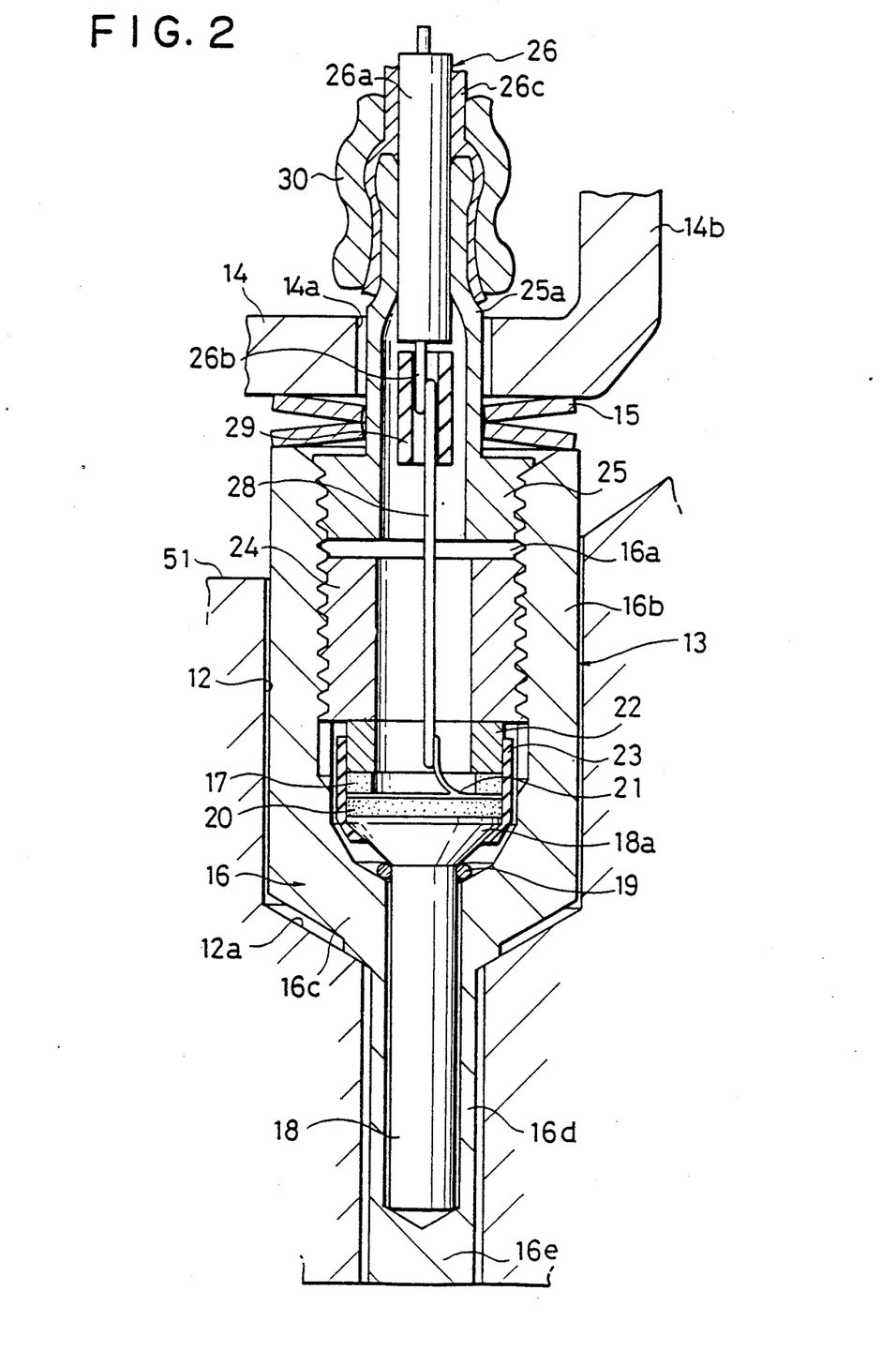
FIG. 2 is a sectional view showing a first embodiment of the present invention.
Figure 3:
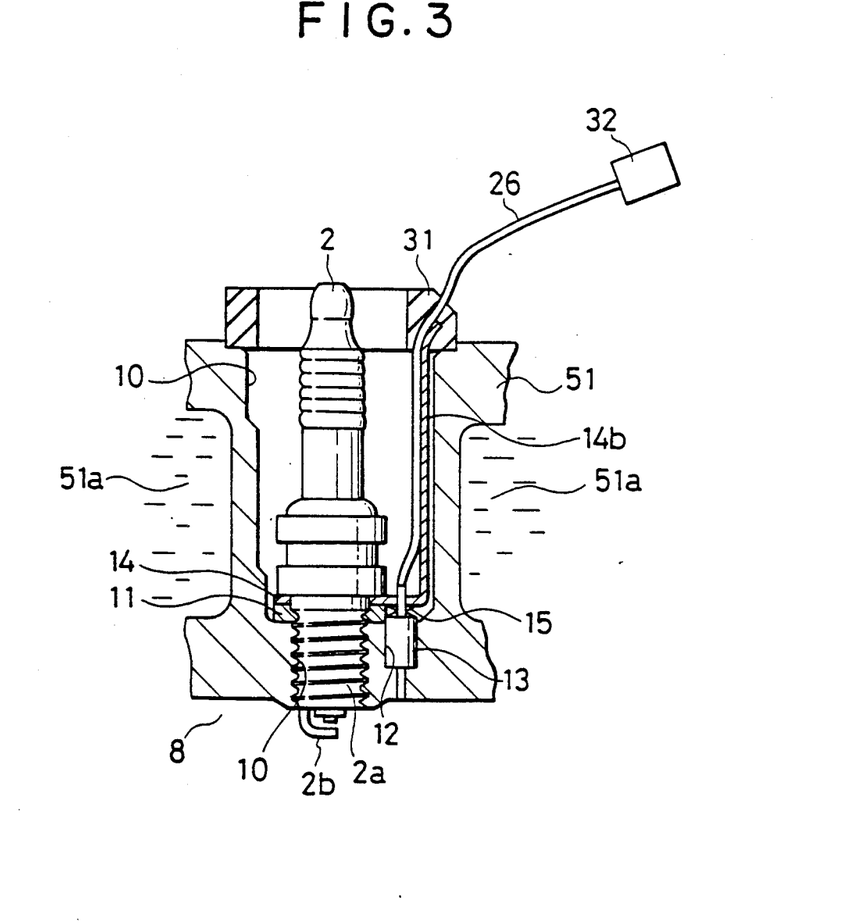
FIG. 3 is a full sectional view showing the mounted stat of a spark plug and a pressure sensor in this embodiment.

Now referring to FIG. 2 and FIG. 3, these drawings illustrate a first embodiment of the mounting device for a pressure sensor of the present invention. FIG. 2 is a sectional view showing details of the structure of a pressure sensor 3 and the mounting device. FIG. 3 is a sectional view showing the mounted state of a spark plug 2 and the pressure sensor 3. FIG. 3 shown a cylinder head 51 provided with a water jacket 51a. A combustion chamber 8 is formed by being enclosed by the piston head 51 and a cylinder block and a piston which are omitted from the drawing. A spark plug housing section 10 is formed as an indentation in the cylinder head 51. A threaded section 2a on the spark plug 2 is screwed into a tapped plug mounting hole 10a formed in the bottom of the housing section 10, through a thickness adjusting gasket 11 for adjusting the thickness. An electrode section 2b for providing a spark projects intot he combustion chamber 8. A hopper-shaped sensor housing orifice 12 which communicates with the combustion chamber 8 is formed in the bottom of the housing section 10, and the pressure sensor 13 for detecting the combustion pressure is inserted into the sensor housing orifice 12. The sensor housing orifice 12 has a tapered section 12a as a sensor receiving section.

The upper surface of the pressure sensor 13 is pressed by a presser member 14, which is integrally secured by clamping with the gasket 11, together with a spring member 15 such as a plate spring used as a vibration absorbing member by the screwed installation of the spark plug 2. As a result, the pressure member 13 is secured in a stable and airtight manner in the sensor housing orifice 12. The pressure sensor 13, as shown in FIG. 2, comprises a housing 16 which is interposed in the sensor housing orifice 12, a piezoelectric element 17 for convenrting the combustion pressure to an electric signal, and a rod 18 for transmitting the combusting pressure to the piezoelectric element 17.

The housing 16 comprises a large diameter cylindrical section 16b with a female threaded section 16a in its internal peripheral surface, a thick-walled, small diameter cylindrical section 16d connected to the bottom end of the large diameter cylindrical section 16b through a tapered section 16c used as a seal, and a pressure receiving section 16e formed on the bottom end of the small diameter cylindrical section 16d.

A rod 18 long enough for its bottom end to reach the pressure receiving section 16e is inserted into the small diameter cylindrical section 16a of the housing 16 with this configuration. The concentricity between the rod 18 and the small diameter cylindrical section 16d is ensured by an O-ring 19, fitted around the outer periphery of the upper end of the rod 18, which engages the open end edge of the small diameter cylindrical section 16d where it joins with the large diameter cylindrical section 16b. In addition, a circular insulating plate 20, an electrode plate 21, the doughnut-shaped piezoelectric element 17, and a metallic ring member 22 are laminated, in order, on a reverse conical section 18a formed on the upper end of the rod 18. This laminated member and the rod 18 are integrally joined and at the same time maintained in a concentric state by the compression of the outer periphery of the laminated member by a contractible bushing material 23 such as Teflon or the like.

A metallic cylindrical screw member 24 is screwed into the feme threaded section 16a of the large diameter cylindrical section 16b. The complete rod 18 including the piezoelectric element 17 is maintained in a stable manner within the housing 16 by pressure of the screw member 24 against a ring member 22. In addition, a metallic cap member 25 is screwed into the upper opening of the large diameter cylindrical section 16b.

A shell member 25a for isolating a signal is interrally joined to the center of the upper surface of the cap member 25 adn extends upward through a throughhole- 14a formed in the presser member 14. An insulation-covered secton 26a of a shielded cable 26 is inserted into this extended section. A core-wire 26b of the shielded cable 26 is connected to the electrode plate 21 through a lead-wire 28. The connection section of the core-wire 26b and the lead-wire 28 is covered by an insulated tube 29. Also, an outer conductor 26c of the shielded cable 26 is positioned in an outer peripheral enclosure of the shell member 25a into which the shielded cable 26 is inserted. A sleeve 30 made of copper or the like engages this outer peripheral section. The shielded cable 26 and the shell member 25a are integrally joined, by caulking with the sleeve 30, and also become electrically conducting.

The other end of the shielded cable 26, as shown in FIG. 3, pierces a rubber member 31 for excluding moisture from the housing which is secured to a support section 14b of the presser member 14, and is drawn out of the system. A connector 32 is connected to the drawn out end of the shielded cable 26.

The spring member 15 absorbs the displacement and vibration of the spark plug 2 and make securely maintain the pressure sesnor 13 in the sensor housing orifice 12. The spring member 15, as shown in FIG. 2, is interposed between the presser member 14 and the upper end sides of the housing 16, and, as a result of this configuration, the action of the displacement and vibration of the spark plug 2 on the piezoelectric element 17 of the pressure sensor 13 is restrained.

By filling an insulating molding material into the empty spaces in the large diameter cylindrical section 16b of the housing 16, the insulating capabilities of the piezoelectric element 17 and of the other are ensured, heat transmission is good, and an internal temperature rise is prevented.

In addition, it is preferable if the housing 16 which constitutes the pressure sensor 13 is fabricated from a metal with a high corrosion resistance such as 403 SS (18 Cr, 8 Ni steel). It is particularly desirable that the pressure receiving section 16e is nickel-plated or chromeplated, or the like, and obtain a mirror finish to minimize heat inflow. The rod 18 should be fabricated from 304 SS, 42 Ni steel, or 36 Ni steel or the like for low heat transmission and high rigidity.

In the mounting device for a pressure sensor 13 of this structure, when the spark plug is tightened to the stipulated force of 2.5 kg m, the pressure sensor 13 is tightened to about 1000 kg axial force. At this time, about 2.5 kg of spring force is generated in the spring member 15, specifically, if it is an initially coned disc spring of an inner diameter of 2.4 mm, outer diameter 5.8 mm, and thickness 0.35 mm. Accordingly, this spring force has very little effect on the tightness of the spark plug 2. Further, if the spring force is 25 kg, about 1000 kg/cm$^2$ of surface stress is developed between the tapered section 16c of the pressure sensor 13 and the tapered section 12a of the sensor housing orifice 12. As a result an adequate degree of close adhesion is obtained between the two, and gas leakage from the sensor housing orifice 12 is prevented. In this case, if a copper gasket or the like is used, the airtightness is improved even more.

In addition, when the pressure sensor 13 is in the erected state, as shown in FIG. 2, the rubber member 31 and the pressure sensor 13 are combined with the presser member 14. For this reason, in the case where the pressure sensor 13 is mounted in the cylinder head 51, the pressure sensor 13 is inserted in advance in the sensor housing orifice 12 by making use of the support section 14a of the pressure member 14, after which the threaded section 2a of the spark plug 2 is pushed into the housing section 10 of the cylinder head 51, and may be screwed in. Accordingly, it is possible to disconnect the spark plug 2 only from the cylinder head 51, and to maintain easily the spark plug 2.

When the combustion gas in the combustion chamber 8 is ignited, the combustion pressure acts on the pressure receiving section 16e. As a result, the small diameter cylindrical section 16d, which includes the pressure receiving section 16e, is bent in the axial direction so that the bending force acts on the piezoelectric element 17 through the rod 18, and its strees is changed. As a result, the piezoelectric element 17 produces a voltage corresponding to the combustion pressure from the piezo effect. This voltage passes through the electrode plate 21, the lead wire 28, and the shielded cable 26, and is output from the system.

The spark plug 2 vibrates at this time because the combustion pressure also acts on the spark plug 2. The spring member 15 is interposed between the presser member 14 and the pressure sensor 13 so that the vibration of the spark plug 2 is absorbed by the spring member 15 and is not transmitted to the pressure sensor 13. As a result, it is possible to precisely detect the combustion pressure.

During combustion, heat is also transmitted to the pressure receiving section 16e, and this heat passes through the small diameter cylindrical section 16d and the tapered section 16c, and escapes from the cylinder head 51. Furthermore, because the rod 18 is fabricated from a material with how heat transfer, the effect of the heat on the pressure sensor 13 is small.

All that is necessary to install the pressure sensor 13 is to insert the pressure sensor 13 into the sensor housing orifice 12. Therefore compared to the most typical type of conventional pressure sensor 13, which is installed by being screwed in, space for tools and the like is unnecessary. In addition, the unit can be made small and an improvement in the operationability of installation is also obtained.

In addition, the pressing force of the presser member 14 on the pressure sensor 13 is received by the tapered section 16c of the housing 16 so that this pressing force is not applied to the piezoelectric element 17. Further, by the use of mounting or disconnecting the spark plug 2, the pressure sensitivity of the piezoelectric element 17 is uniformly maintained, even if the pressing force is changed.

Figure 4:
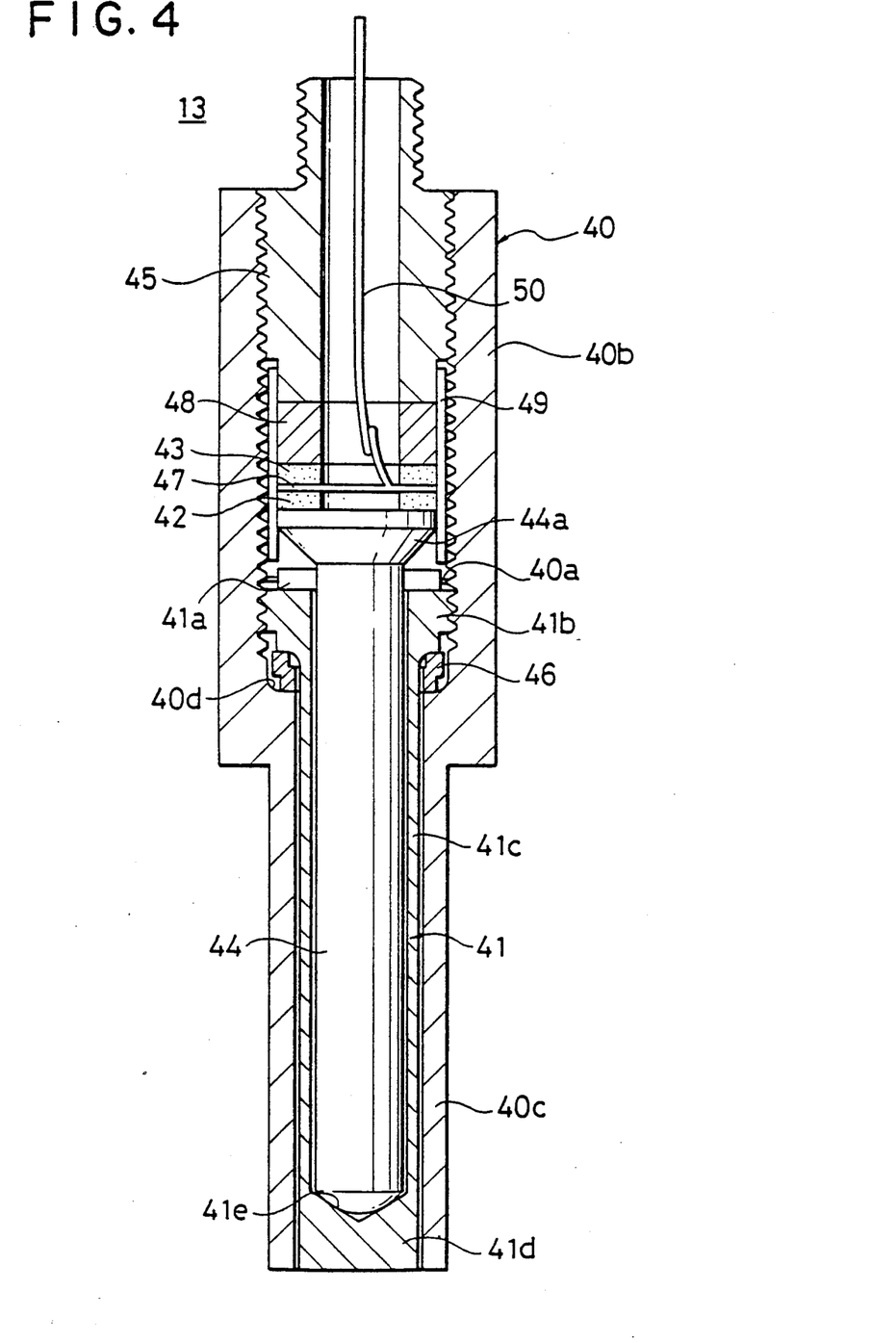
FIG. 4 is a sectional view of the pressure sensor showing a second embodiment of the present invention.

FIG. 4 is sectional view showing a second embodiment of the present invention.

The feature of this embodiment is that the effect of heat on the pressure sensor has been reduced.

In FIG. 4, the pressure sensor 13 comprises a housing 40 which is inserted into the sensor housing orifice 12 of the cylinder head 51 in the same manner as in the embodiment shown in FIG. 2, a pressure-receiving cylindrical casing 41, a pair of piezoelectric elements 42, 43, a rod 44 through which the combustion pressure is transmitted to the piezoelectric element 42, 43, and a cap member 45. The housing 40 is provided with a large diameter cylindrical section 40b with a female threaded section 40a on its inner peripheral surface, and a small diameter cylindrical section 40c joined to the lower end of the large diameter cylindrical section 40b.

The cylindrical casing 41 comprises a collar section 41b which is screwed into the female threaded section 40a of the large diameter cylindrical section 40b and to which is attached a tool engaging groove 41a; a thick-walled tubular section 41c joined to the lower end of the collar section 41b; and a pressure receiving section 41d formed on the lower section of the tubular section 41c are provided.

The cylindrical casing 41 is screwed into the housing 40 to the collar section's 41b reaching to a step section 40d on the inside of the large diameter cylindrical section 40b. The tubular section 41c is positioned in the small diameter cylindrical section 40c of the housing 40, and the end surface of the pressure receiving section 41d is exposed at the opening of the small diameter cylindrical section 40c.

In addition, the rod 44 for transmitting the combustion pressure is inserted into the cylindrical casing 41 from the top, and the arc-shaped lower end of the rod 44 contacts a tapered bottom surface 41e of the cylindrical casing 41 so that the rod 44 and the cylindrical casing 41 are concentric.

Then, the piezoelectric elements 42, 43 are positioned in a laminated manner on a reversed cone section 44a which projects into the large diameter cylindrical section 40b, with an electrode plate 47 enclosed between the piezoelectric elements 42, 43. A ring section 48 for alleviating the concentrated stress is positioned as a lamination on the piezoelectric element 43. The outer periphery of the laminated member formed in this manner is covered by an insulating tube material 49 of Teflon or the like. The concentricity of the piezoelectric elements 42, 43 and the rod 44 is preserved, and a uniform stress is applied to the piezoelectric elements 42, 43.

In addition, the hollow cap member 45 is screwed into the open section of the large diameter cylindrical section 40b. The rod 44 and the piezoelectric elements 42, 43 are pressed into the pressure receiving section 41d of the cylindrical casing 41 at a specified pressing force by tightening the cap member 45. One end of the lead wire 50 is joined to the electrode plate 47 by spot welding or the like, and the other end is passed into the cap member 45 and drawn through to the outside and joined to the shielded cable in the same manner as in the case shown in FIG. 2.

The rod 44 and the cylindrical casing 41 are formed, for example, from 13 Cr stainless steel or the like for grounding. A material with the same coefficient of thermal expansion as these parts is desirable to avoid thermal warp.

In the heat sensor 13 with this configuration, when the combustion pressure is applied to the pressure receiving section 41d of the cylindrical casing 41, the tubular section 41c is bent in the axial direction, so that this bending force acts on the piezoelectric elements 42, 43 through the rod 44 and is converted to pressure. As a result, a voltage corresponding to the combustion pressure is produced in the piezoelectric elements 42, 43 from the piezo effect.

At this time, part of the force applied to the pressure receiving section 41d of the cylindrical casing 41 escapes to the housing 40 via the tubular section 41c, so it is desirable that the wall of the tubular section 41c be made as thin as possible, and the rod 44 have as large a diameter as possible.

The heat of combustion is also applied to the pressure receiving section 41d of the cylindrical casing 41, so that by making the gap between the tubular section 41c and the small diameter cylindrical section 40c as small as possible the heat in the cylindrical casing 41 can escape to the housing 40, and the thermal expansion of the piezoelectric elements 42, 43 can be small. In addition, by applying a material with good thermal absorption, for example, a black film, on the outer peripheral surface of the tubular section 41c and the inner peripheral surface of the small diameter cylindrical section 40c, the heat transmission is even further improved, as is the effect of the heat on the piezoelectric elements.

Furthermore, by making the gap between the small diameter cylindrical section 40c and the cylindrical casing 41 narrow, the amount of the combustion gases which enters between the small diameter cylindrical section 40c and the cylindrical casing 41 is small and diaphragm become unnecessary, making it possible to restrain the resonance produced from the rolling of the cylindrical casing 41 and the rod 44, without the necessity for a diaphragm. In this case, if the contact surface between the tubular section 41c and the small diameter cylindrical section 40c is covered with an antifriction material such as Teflon or molybdenum disulfide or the like, the vibration prevention effect is further improved.

In this way, the effect of the heat of combustion on the piezoelectric elements can be reduced in the embodiment shown in FIG. 4. As a result it is possible to precisely detect the combustion pressure. The pressure acting on the pressure receiving section 41d can be directly applied to the piezoelectric elements through the rod 44, so that the pressure can be detected with good accuracy.

The explanation of the embodiment of FIG. 4 has been made for the case where a pair of piezoelectric elements is provided. One of these piezoelectric elements may be an insulating member. In this case, when a ceramic such as steatite (MgO-SiO) with a low heat transfer coefficient is used, a heat transfer coefficient of about 1/10$^{th}$ that of steel is possible and the temperature increase of the piezoelectric elements can be even further restrained.

Figure 5:
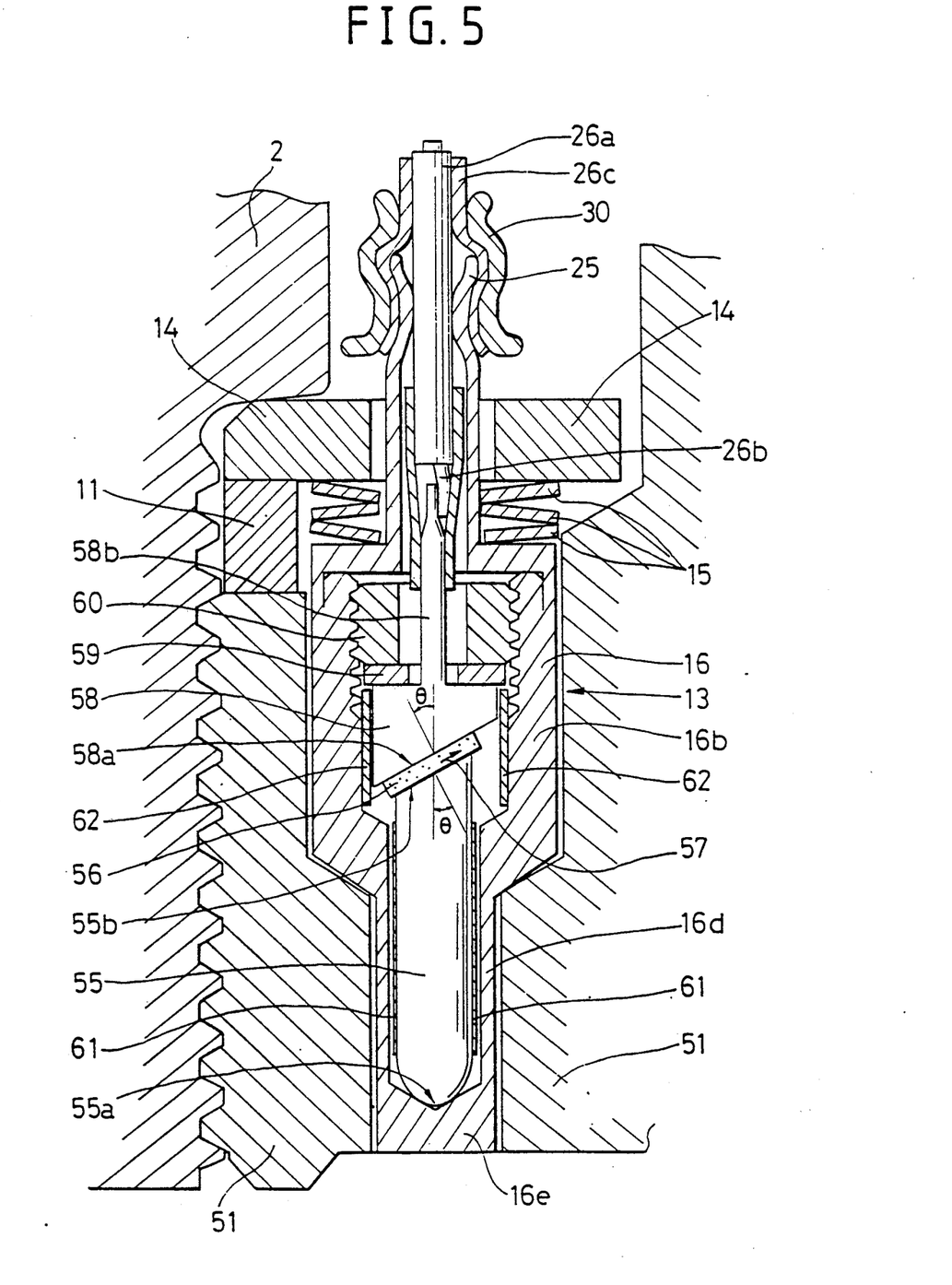
FIG. 5 is a sectional view of the pressure sensor showing a third embodiment of the present invention.

FIG. 5 is a sectional view showing a third embodiment of the present invention. In FIG. 5, the same reference numerals as those in FIGS. 2 and 3 respectively designate the members corresponding to those in FIGS. 2 and 3.

In FIG. 5, a rod 55 is inserted into the small diameter cylindrical section 16d of the housing 16. The rod 55 is rounded at the tip 55a thereof to ensure concentricity between the rod 55 and the small diameter cylindrical section 16d. The upper end of the rod 55 has a slope 55b of Θ degrees from the center line.

A piezoelectric element 56 having a polarization 57 in a shearing direction is positioned on the slope 55b. A support member 58 with a slope 58a of the same degrees as that of the slope 55b is positioned on the piezoelectric element 56. The support member 58 is secured through an insulating plate 59 of a high strength material such as alumina by way of a screw member 60. The support member 58 has a lead portion 58b which is welded to a core-wire 26b of a shielded cable 26 to electrically connect the two.

The outer peripheral surface of the rod 55 is covered with a thin Teflon tube 61 through heat shrinkage or the like. A Teflon tube 62 is attached to the inner peripheral surface of the large diameter cylindrical section 16b of the housing 16.

Figure 6:
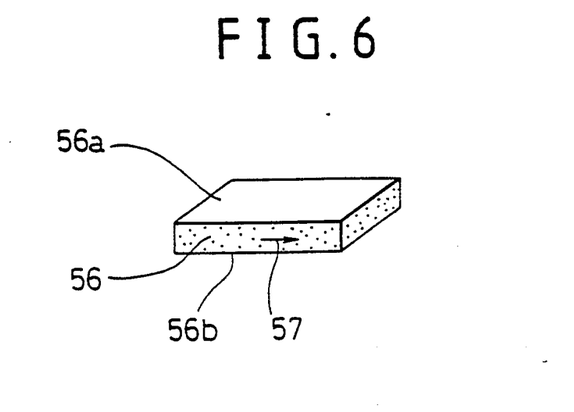
FIG. 6 is a perspective side view showing the piezoelectric element used in the third embodiment.
Figure 7:
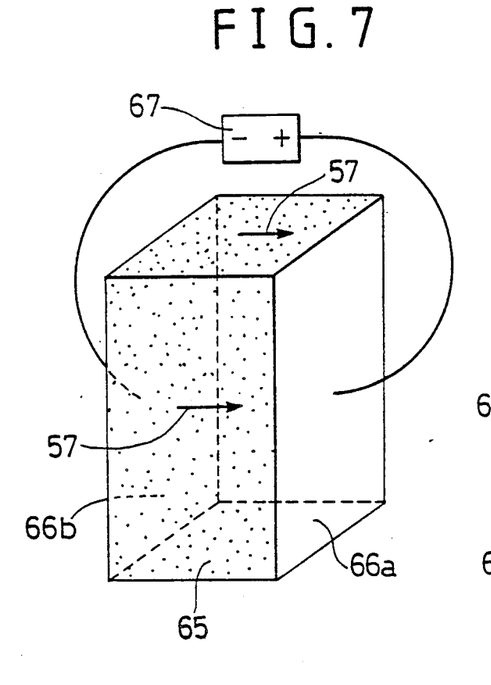
FIGS. 7 and 8 are explanatory drawings showing process for making the piezoelectric element shown in FIG. 6.
Figure 8:
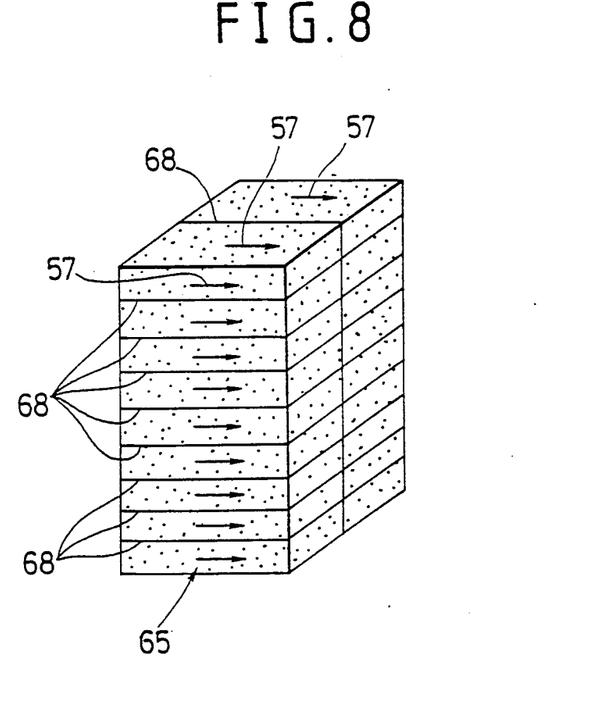

A pair of electrodes 56a, 56b, made of metal film, as shown in FIG. 6, are respectively attached to the upper surface and the lower surface of the piezoelectric element 56. The piezoelectric element 56 has a polarization 57 in the direction designated by the arrow in FIG. 6. The piezoelectric element 56 is made by a process in which a pair of electrodes 66a, 66b made of a metal film are attached, one on each side of a material 65 of a piezoelectric ceramic, a high voltage 67 is applied between the two electrodes 66a, 66b to polarize the material 65, then the electrodes 66a, 66b are detached from the material 65, the material 65 is cut along the cutting section 68 as shown in FIG. 8, and the electrodes 56a, 56b are respectively attached, one on each side of the sectioned material 65.

Figure 9:
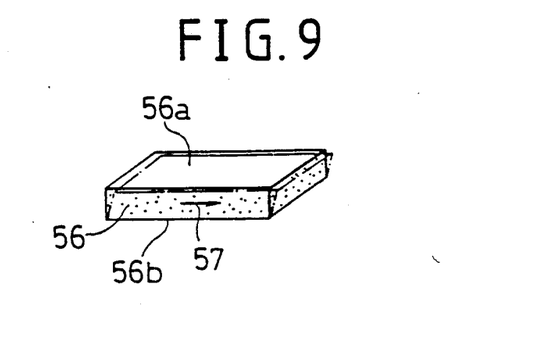
FIG. 9 is a explanatory drawing showing shearing force applied on the piezoelectric element shown in FIG. 6.

When a shearing force which displaces the electrode 56a from the electrode 56b in the direction of the polarization 57 as shown in FIG. 9 is applied to the piezoelectric element 56, electricity is generated between the two electrodes 56a, 56b from the piezo effect of $d_{15}$. The left suffix 1 in $d_{15}$ means that electricity is generated in a direction (1) vertical to that of the polarization 57. The right suffix 5 in $d_{15}$ means that the surface in the direction (1) vertical to that of the polarization 57 is pulled in the direction (3) of the polarization 57. The fabrication of the piezoelectric element 56 for the piezo effect of $d_{15}$ is complex and it is difficult to apply stress to the element, while the piezoelectric element 56 for the piezo effect of $d_{15}$ has a higher sensitivity than that of $d_{33}$ and has the large advantage of not generating pyroelectricity because the direction of the generation of electricity does not agree with the direction of the polarization 57.

In the pressure sensor 13 with this configuration, when the combustion pressure is applied to the pressure receiving section 16e, a part of the stress acts on the rod 55. In this case, the stress is properly applied to the rod 55 in the axial direction because the rod 55 is supported on the central portion of the inside of the pressure receiving section 16e because of the round shape of the tip 55a of the rod 55.

The piezoelectric element 55 is pressed at Θ degrees by the slopes 55b, 58a of the rod 55 and the support member 58 respectively, so the force acting on the piezoelectric element 56 is separated into components vertical and horizontal to the surface of the piezoelectric element 55 respectively.

For example, when the angle Θ in FIG. 5 is thirty degrees, half (= sin 30°) of the force from the rod 55 acts on the piezoelectric element 55 as a horizontal component, is converted to electricity through the piezo effect of $d_{15}$, and is output. Electricity is output only proportioned to the horizontal component of the force because the piezoelectric element 55 is not sensitive to the vertical component of the force.

The horizontal component of the force acts on the rod 55 and the support member 58 in the lateral direction, but the rod 55 and support member 58 are prevented from being displaced from the center line by the Teflon tubes 61, 62. The Teflon tubes 61, 62 also prevent the piezoelectric element 55 from contracting the housing 16 by maintaining the rod 55 in the center position.

Moreover, it is necessary that the slopes 55b, 58a have a high coefficient of friction to prevent the slopes 55b, 58a from sliding. Therefore, it is necessary to prevent oil and/or dust from becoming attached to the slopes 55b, 58a and to prevent an oxidation film from being produced on the metal surface of the slopes 55b, 58a before contacting the piezoelectric element 56. Further, it is effective to attach the metal surfaces of the slopes 55b, 58a to the surfaces of the electrodes 56a, 56b by means of adhesive material to prevent the slopes 55b, 58a from sliding.

In addition, the present invention can be applied in a stress sensor which measures the stress produced in the pressure receiving section.

What is claimed is:

1. A mounting device for a pressure sensor, comprising:
   (a) a cylinder head having a threaded hole for mounting a spark plug, a sensor housing orifice penetrating into a combustion chamber adjacent to the threaded hole, and a sensor receiving section in the sensor housing orifice;
   (b) a pressure sensor comprising
      (1) a housing inserted into the sensor housing orifice and having a pressure receiving section provided on the end section of the combustion chamber side and directly receiving the combustion pressure, and
      (2) a piezoelectric device housed in the housing and producing a voltage corresponding to the combustion pressure received at the pressure receiving section;
   (c) a presser member pressing the pressure sensor toward the pressure receiving section by tightening of the spark plug when the spark plug is installed in the cylinder head; and
   (d) a vibration absorbing member interposed between the presser member and the pressure sensor and absorbing the vibration and the displacement transmitted from the presser member.

2. The mounting device for a pressure sensor of claim 1 wherein the vibration absorbing member comprises a spring member.

3. The mounting device for a pressure sensor of claim 1 provided with a rod for transmitting the combustion pressure received at the pressure receiving section to the piezoelectric element.

4. The mounting device for a pressure sensor of claim 3 wherein the rod is housed in the housing and the end of the rod on the combustion chamber side contacts the pressure receiving section.

5. The mounting device for a pressure sensor of claim 4 wherein the rod has a slope at the end of the rod on the piezoelectric device side and the piezoelectric device has a polarization in a direction of the slope; the mounting device comprising a support member with a slope corresponding to the slope of the rod, the support member being positioned so as to put the piezoelectric device between the slope of the rod and the slope of the support member.

6. The mounting device for a pressure sensor of claim 3 wherein the rod is formed from a material with a small heat transfer coefficient.

7. A mounting device for a pressure sensor, comprising:
   (a) a cylinder head having a threaded hole for mounting a spark plug, and a sensor housing orifice penetrating into a combustion chamber adjacent to the threaded hole and a sensor pressure receiving section in the sensor housing orifice;
   (b) a pressure sensor comprising
      (1) a housing inserted into the sensor housing orifice and having a opening in the combustion chamber side,
      (2) a cylindrical casing housed in the housing, and having a pressure receiving section provided on the end section of the combustion chamber side and directly receiving the combustion pressure, and
      (3) a piezoelectric device housed in the housing and producing a voltage corresponding to the combustion pressure received at the pressure receiving section;
   (c) a presser member pressing the pressure sensor toward the pressure receiving section by tightening of the spark plug when the spark plug is installed in the cylinder head; and
   (d) a vibration absorbing member interposed between the presser member and the pressure sensor and absorbing the vibration and the displacement transmitted from the presser member.

8. The mounting device for a pressure sensor of claim 7 wherein the vibration absorbing member comprises a spring member.

9. The mounting device for a pressure sensor of claim 7 provided with a rod for transmitting the combustion pressure received at the pressure receiving section to the piezoelectric element.

10. The mounting device for a pressure sensor of claim 9 wherein the rod is housed in the cylindrical casing and the end of the rod on the combustion chamber side contacts the pressure receiving section.

11. The mounting device for a pressure sensor of claim 9 wherein the rod is formed from a material with a small heat transfer coefficient.

* * * * *